(12) United States Patent  
Marcille et al.

(10) Patent No.: US 8,959,413 B2
(45) Date of Patent: Feb. 17, 2015

(54) METHOD FOR RETRANSMITTING FRAGMENTED PACKETS

(71) Applicant: Thales, Neuilly-sur-Seine (FR)

(72) Inventors: Sebastien Marcille, Gennevilliers (FR); Christophe Le Martret, Gennevilliers (FR); Philippe Ciblat, Paris (FR)

(73) Assignee: Thales, Neuilly sur Seine (FR)

( * ) Notice: Subject to any disclaimer, the term of this patent is extended or adjusted under 35 U.S.C. 154(b) by 134 days.

(21) Appl. No.: 13/720,761

(22) Filed: Dec. 19, 2012

(65) Prior Publication Data

US 2013/0159807 A1 Jun. 20, 2013

(30) Foreign Application Priority Data

Dec. 20, 2011 (FR) ...................................... 11 03948

(51) Int. Cl.
*H03M 13/09* (2006.01)
*H04L 1/08* (2006.01)
*H03M 13/53* (2006.01)

(52) U.S. Cl.
CPC ........................................ *H04L 1/08* (2013.01)
USPC .......................................... 714/758; 714/776

(58) Field of Classification Search
None
See application file for complete search history.

(56) References Cited

U.S. PATENT DOCUMENTS

2006/0209837 A1 9/2006 Lee et al.
2010/0050038 A1 2/2010 Martret et al.

FOREIGN PATENT DOCUMENTS

EP 1677449 A2 7/2006
WO 2008/077909 A2 7/2008

OTHER PUBLICATIONS

Sebastien Marcille, et al., "Performance Computation of Cross-Layer Hybrid ARQ Schemes at IP Layer in the Presence of Corrupted Acknowledgments", 2011 Third International Workshop on Cross Layer Design (IWCLD), Nov. 30, 2011, pp. 1-5, IEEE, XP032088203.
Aude Le Duc, et al., "Analysis of a Cross-Layer Hybrid-ARQ Scheme: Application to Unequal Packet Protection", 2011 IEEE International Conference on Communications in Kyoto, JP, Jun. 5-9, 2011, pp. 1-5, IEEE, Piscataway, NJ, USA, XP031908273.

*Primary Examiner* — April Y Blair
*Assistant Examiner* — Dipakkumar Gandhi
(74) *Attorney, Agent, or Firm* — Baker & Hostetler LLP

(57) ABSTRACT

A method is provided for retransmitting fragmented packets for which a transference of retransmission credit is performed from one fragment onto the next. The method makes it possible to do away with the drawbacks of the methods existing by appreciably improving performance in terms of untransmitted packet rate and by making it possible to configure the distribution of the error probabilities for the fragments of an IP packet.

20 Claims, 7 Drawing Sheets

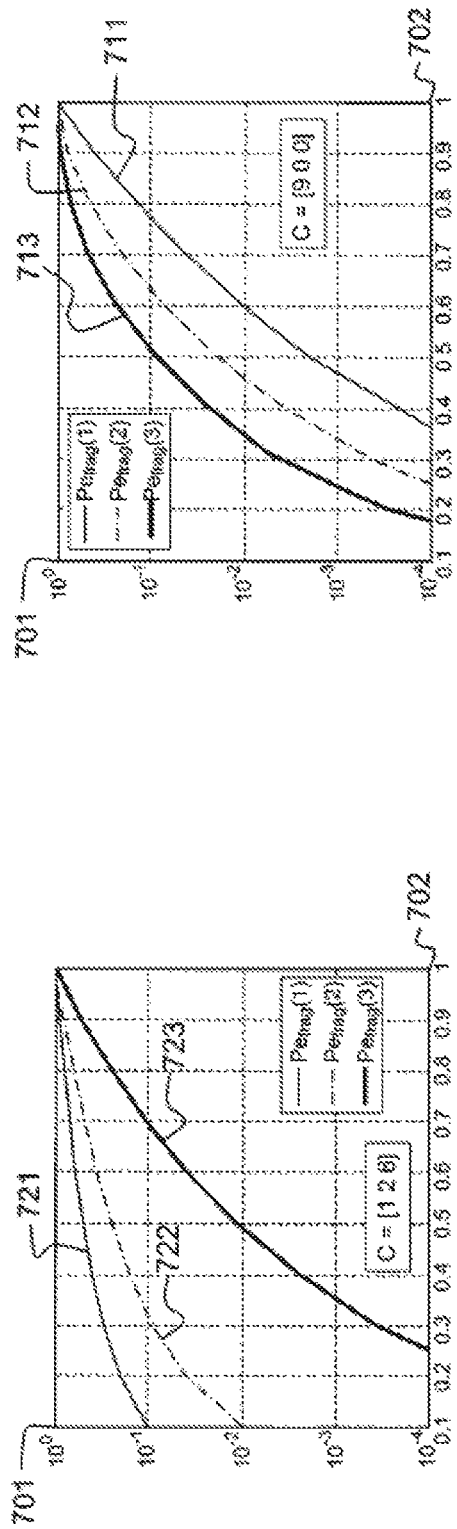
FIG.7a
FIG.7b
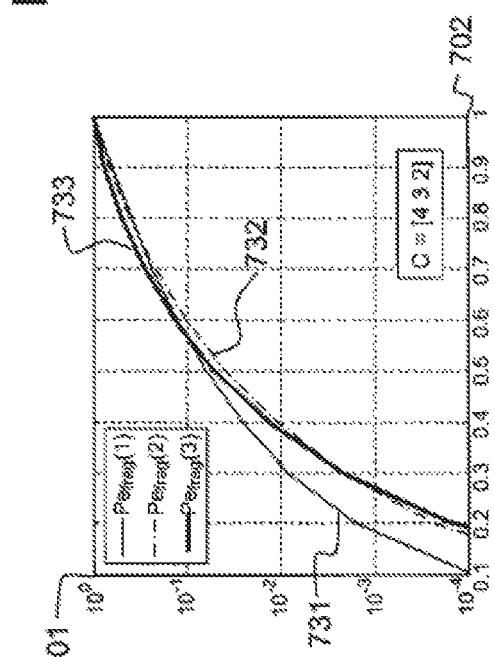
FIG.7c

METHOD FOR RETRANSMITTING FRAGMENTED PACKETS

CROSS-REFERENCE TO RELATED APPLICATION

This application claims priority to foreign French patent application No. FR 1103948, filed on Dec. 20, 2011, the disclosure of which is incorporated by reference in its entirety.

FIELD OF THE INVENTION

The present invention relates to the field of digital communications and more precisely that of the transmission of data in the form of fragmented packets. The invention pertains to a method for retransmitting fragmented packets which is adapted for improving the error rate performance notably in the case where the transmission pathway, both outward and return, is subjected to disturbances which may engender errors in the transmitted packets. The invention advantageously applies to communication networks using the IP protocol and which comprise at least one wireless link.

The invention is advantageously implemented at the level of the MAC ("Medium Access Layer") layer of the OSI ("Open Systems Interconnection") model, in which layer a fragmentation process is implemented to generate MPDU ("Mac Protocol Data Unit") packets or more generally PDU ("Protocol Data Unit") packets of fixed size on the basis of an MSDU ("Mac Service Data Unit") packet or more generally an SDU ("Service Data Unit") packet originating from the higher layers and having a variable size. Fragmentation allows adaptation of the size of the IP packets to be transmitted between the MAC layer and the higher layers.

BACKGROUND

The Applicant's international patent application published under the number WO 2008/077909 describes a method of retransmission with incremental redundancy for fragmented packets.

The principle described in this patent application consists in assigning an overall retransmission credit to an IP packet so as to correctly forward the set of fragments associated with this packet with a given transmission time span.

A drawback of this solution is that it is highly sensitive to errors related to the fluctuations of the propagation channel in particular for the return pathway. Indeed the retransmission scheme described is based on the assumption of correct receipt of the acknowledgements sent by the receiver, which is not always the case when the propagation channel is disturbed.

Another drawback of this solution is that it engenders protection to errors that is unequal for all the fragments of an IP packet. By assigning an overall retransmission credit for all the fragments of one and the same IP packet, the first fragment transmitted exhibits a much lower probability of error than the subsequent fragments.

This unequal apportionment of the probabilities of incorrect transmission of a fragment is not always desired.

SUMMARY OF THE INVENTION

The invention makes it possible to do away with the aforementioned drawbacks by appreciably improving performance in terms of untransmitted packet rate and by making it possible to configure the distribution of the error probabilities for the fragments of an IP packet.

The invention is described subsequently in the context of the IP protocol but it applies in an identical manner to any packet to be transmitted arising from a process for fragmenting a data packet of larger size.

The subject of the invention is a method for retransmitting fragmented packets between a emitter and a receiver, said fragmented packets being obtained by fragmentation of a data packet to be transmitted, wherein said method comprises at least the following steps, for each fragmented packet:

Assigning a persistence $P(i)$ of transmission to each fragmented packet, so that the sum of the persistences over the set of said fragmented packets arising from a data packet is equal to a predetermined overall cost of transmitting said data packet and that the persistence $P(1)$ assigned to the first fragmented packet PDU(1) is strictly less than said overall cost (C), Adding an error-detecting code CRC to each fragmented packet, Incrementing a transmission credit counter $c(i)$ and transmitting said fragmented packet to the receiver, On receipt of a positive acknowledgement of receipt of said fragmented packet, transferring the transmission credit remaining $P(i)-c(i)$ to the next fragmented packet: $P(i+1)=P(i-1)+P(i)-c(i)$, On receipt of a negative acknowledgement of non-receipt of said fragmented packet or if no acknowledgement is received after a predetermined time span:
  If the transmission credit counter $c(i)$ is strictly less than the persistence $P(i)$, retransmitting said fragmented packet and incrementing said transmission credit counter $c(i)$,
  In the converse case, inferring the failure of the transmission of said fragmented packet.

According to a particular aspect of the invention, the distribution of the persistences $P(i)$ that are assigned to the set of said fragmented packets PDU(i) is selected, from among the set of possible distributions, so as to obtain a probability of error of transmission of the data packet SDU that is closest to a given probability of error $PER_{IP}$.

According to a particular aspect of the invention, the set of persistences $P(i)$ assigned to each fragmented packet is configured so as to favor the correct transmission of a particular fragmented packet.

In a variant embodiment of the invention, the persistence $P(i)$ is identical for each fragmented packet.

In a variant embodiment of the invention, an error-correcting code is added to each fragmented packet.

In a variant embodiment of the invention, the data packet is an IP packet and the transmitted fragmented packets are MAC packets.

The subject of the invention is also an emitter of data packets comprising means suitable for implementing the retransmission method according to the invention.

The subject of the invention is further a system for transmitting data comprising an emitter according to the invention and a receiver suitable for receiving a fragmented packet, checking its integrity and transmitting to the emitter a positive acknowledgement if said fragmented packet is correct and a negative acknowledgement if said fragmented packet is corrupted.

The subject of the invention is further a computer program comprising instructions for the execution of the retransmission method according to the invention, when the program is executed by a processor as well as a recording medium readable by a processor on which is recorded a program comprising instructions for the execution of the method according to the invention, when the program is executed by a processor.

BRIEF DESCRIPTION OF THE DRAWINGS

Other characteristics and advantages of the invention will become apparent with the aid of the description which follows offered in relation to appended drawings which represent.

DETAILED DESCRIPTION

Figure 1:
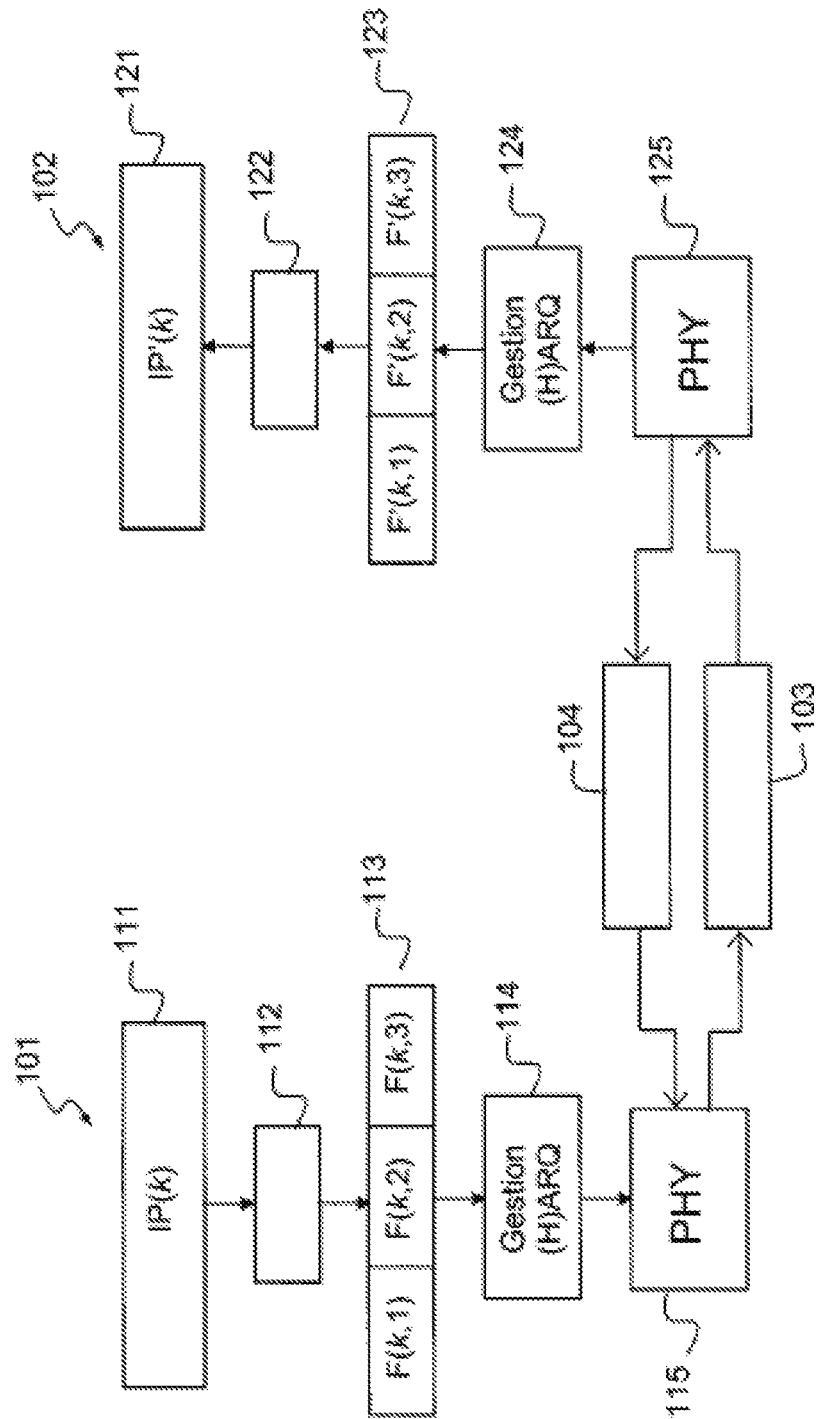
FIG. 1, a schematic of a emitter-receiver system suitable for implementing a method for retransmitting fragmented packets, FIG. 2, a flowchart describing a method for retransmitting fragmented packets according to the prior art, FIG. 3, a flowchart describing the method for retransmitting fragmented packets according to the invention, FIG. 4a, a diagram illustrating in an example, the operation of the method according to the prior art in the case where the return pathway is assumed perfect, FIG. 4b, a diagram illustrating in the same example as in FIG. 4a, the operation of the method according to the invention in the case where the return pathway is assumed perfect, FIG. 5a, a diagram illustrating in an example, the operation of the method according to the prior art in the case where the return pathway is not perfect, FIG. 5b, a diagram illustrating in the same example as in FIG. 5a, the operation of the method according to the invention in the case where the return pathway is not perfect, FIG. 6, a chart illustrating the comparative performance of the method according to the prior art and according to the invention as a function of the signal-to-noise ratio of the transmission channel, FIGS. 7a, 7b and 7c, three charts illustrating the comparative performance of the method according to the prior art and according to the invention, for two different configurations, in terms of distribution of the probabilities of correct transmission of the fragments in an IP packet.

FIG. 1 illustrates, in a schematic, the overall operation of an emitter-receiver system adapted to the implementation of a method for retransmitting fragmented packets.

An emitter 101 and a receiver 102 communicate together through a direct channel 103 and a return pathway 104 undergoing significant variations of their propagation conditions. By convention, the direct channel 103 is the transmission channel making it possible to transmit a data packet from the emitter 101 to the receiver 102. The return pathway 104 is the transmission channel making it possible to transmit an acknowledgement from the receiver 102 to the emitter 101.

The emitter 101 and the receiver 102 each implement a network software stack in the form of layers in accordance with the OSI model. Notably, they comprise a network layer 111,121, a segmentation and reassembly layer 112,122, a layer for access to the transmission medium 113,123, a layer implementing the management of automatic retransmissions or ARQs 114,124 and a physical layer 115,125. An IP packet to be sent at a given instant, indexed by k, is segmented into several MAC fragments F(k,1), F(k,2), F(k,3). Each fragment is sent one or more times according to the chosen retransmission policy. The fragments to be sent are shaped for transmission by the physical layer and then transmitted on the direct channel 103. The receiver 102 receives a MAC fragment and generates an acknowledgement, via the return pathway 104, as a function of the chosen retransmission policy. Once all the fragments F'(k,1), F'(k,2), F'(k,3) have been received, they are reassembled to reform a packet IP'(k).

Figure 2:
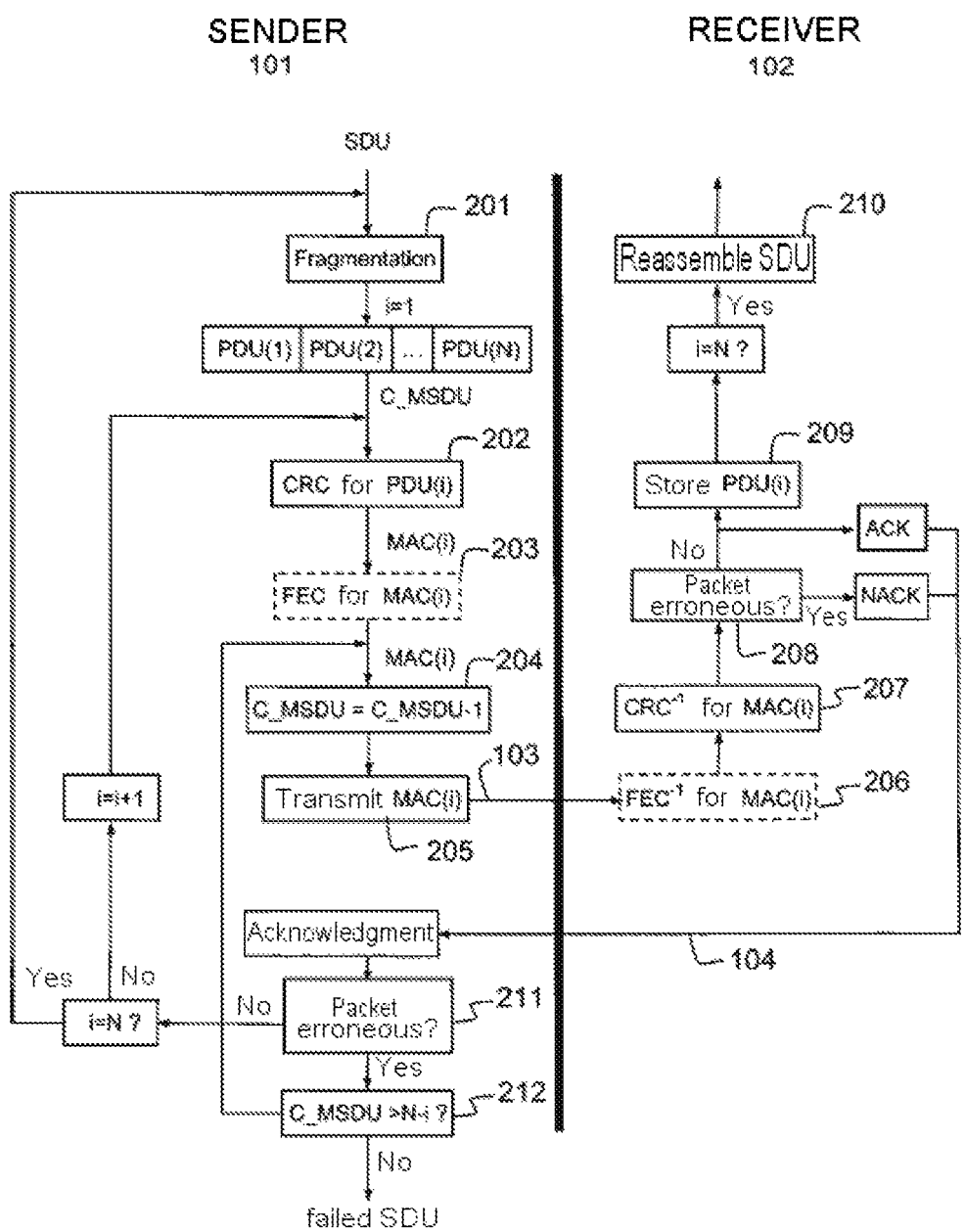

FIG. 2 describes in a flowchart the method for retransmitting fragmented packets according to the prior art described notably in application WO 2008/077909.

The flowchart of FIG. 2 shows diagrammatically on the left of the figure the processing operations executed by the emitter 101 and on the right of the figure the processing operations executed by the receiver 102.

A data packet SDU, for example an IP packet, is transmitted to a fragmentation step 201 which segments the packet SDU into a plurality of fragments PDU(i) for i varying from 1 to N. The fragments PDU(i) correspond, for example, to the data encapsulated in a MAC frame. The method according to FIG. 2 is configured by an overall retransmission credit parameter C_MSDU which corresponds to the maximum number of retransmissions allocated for successful correct transmission of the N fragments PDU(i) associated with the data packet SDU. A retransmission counter is initialized to the overall retransmission credit C_MSDU. For each fragment PDU(i), a packet MAC(i) is generated by adding 202 an error-detecting code, for example a CRC cyclic redundancy check code. Optionally, the packet MAC(i) created may be protected 203 by an FEC error-correcting code within the framework of a hybrid retransmission method. The retransmission counter is decremented 204 and then the packet MAC(i) is transmitted via the transmission channel 103.

The receiver 102 receives each packet MAC(i), decodes the corrector code 206, if any, and then the redundancy check code 207 so as to determine 208 whether the packet received is correct or erroneous. In the first case, a positive acknowledgement ACK is dispatched to the emitter 101 via the return pathway 104. In the second case, a negative acknowledgement NACK is dispatched.

If the packet received is detected as being correct, the associated fragment PDU(i) is stored 209 while waiting to receive all the fragments required for the reassembly 210 of the data packet SDU.

On receipt of an acknowledgement, the emitter 101 verifies 211 whether the latter is negative in which case, it compares the retransmission counter equal to the retransmission credit remaining with the number of fragments N−i remaining to be transmitted. If the remaining retransmission credit is less than the number of fragments remaining to be transmitted, the method infers the failure of the transmission of the data packet SDU. In the converse case, the packet MAC(i) associated with the acknowledgement received is retransmitted.

If the acknowledgement received 211 is positive, then the next fragment PDU(i) is transmitted, until the set of fragments constituting the data packet SDU is transmitted.

A drawback of the method according to the prior art described in FIG. 2 is that it is not sufficiently efficacious when the propagation channel exhibits variations such that several negative acknowledgements may be received consecutively for one and the same packet. In such a case, the overall retransmission credit allocated for a data packet SDU is heavily consumed for the first fragment to be transmitted. The probability of correct receipt of a fragment is therefore unequal as a function of the position of this fragment in the initial data packet SDU.

Figure 3:
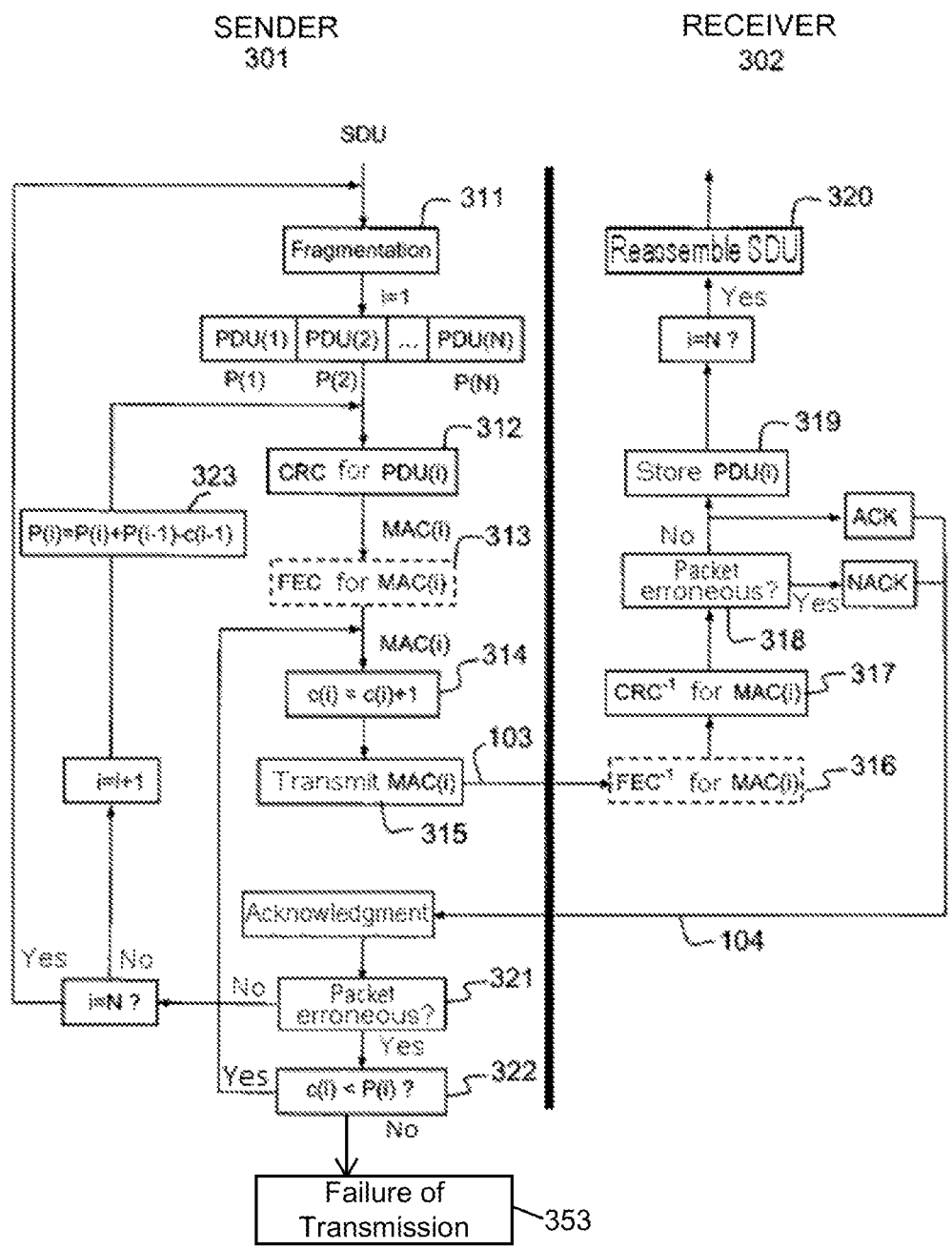

FIG. 3 describes in a flowchart the method for retransmitting fragmented packets according to the invention.

Instead of allocating an overall retransmission credit for all the fragments of an IP packet, the invention consists in allotting a retransmission persistence for each fragment of one and the same IP packet. When the number of retransmissions required to transmit a fragment correctly is less than the persistence allocated to this fragment, the remaining retransmission credit is reallocated to the next fragment and so on and so forth until the last fragment of the IP packet.

The transference of retransmission credit from one fragment to another makes it possible to supervise the probabilities of failure of transmission of each fragment and to improve the overall performance of the retransmission mechanism when the channel is heavily disturbed.

The method consists of the execution of the following steps. The flowchart of FIG. 3 shows diagrammatically on the left of the figure the processing operations executed by the emitter 301 and on the right of the figure the processing operations executed by the receiver 302.

A data packet SDU, for example an IP packet, is transmitted to a fragmentation step 311 which segments the packet SDU into a plurality of fragments PDU(i) for i varying from 1 to N. The fragments PDU(i) correspond, for example, to the data encapsulated in a MAC frame. The method according to FIG. 3 is configured by a suite of parameters consisting of the allocation of a persistence P(i) for each fragment PDU(i) of an IP packet. A retransmission counter c(i) is initialized to zero. For each fragment PDU(i), a packet MAC(i) is generated by adding 312 an error-detecting code, for example a CRC cyclic redundancy check code. Optionally, the packet MAC(i) created may be protected 313 by an FEC error-correcting code within the framework of a hybrid retransmission method. The retransmission counter c(i) is incremented by one unit 314 and then the packet MAC(i) is transmitted 315 on the transmission channel 103.

The receiver 302 receives each packet MAC(i), decodes the corrector code 316, if any, and then the redundancy check code 317 so as to determine 318 whether the packet received is correct or erroneous. In the first case, a positive acknowledgement ACK is dispatched to the emitter 301 via the return pathway 104. In the second case, a negative acknowledgement NACK is dispatched.

If the packet received is detected as being correct, the associated fragment PDU(i) is stored 319 while waiting to receive all the fragments required for the reassembly 320 of the data packet SDU.

On receipt of an acknowledgement, the emitter 301 verifies 321 whether the latter is negative in which case, it compares the retransmission counter c(i) with the persistence P(i) of the fragment PDU(i). If c(i) is less than P(i) as shown in step 322, then the packet MAC(i) associated with the acknowledgement received is retransmitted. In the converse case, the retransmission credit P(i) allocated to the fragment PDU(i) is exhausted, a failure of transmission of said fragmented packet is inferred in step 353, and the method is repeated for the next fragment.

If the acknowledgement received 321 is positive, then the retransmission credit remaining unused for the fragment PDU(i−1), equal to P(i−1)−c(i−1), is transferred 323 to the next fragment PDU(i). The persistence P(i) of the fragment PDU(i) then becomes equal to P(i)+P(i−1)−c(i−1). In this way, the maximum number of retransmissions for each fragment is managed in a dynamic manner as a function of the acknowledgements received.

If no acknowledgement is received after a predetermined time span, the steps of the method are identical to those executed on receipt of a negative acknowledgement.

Figure 4:
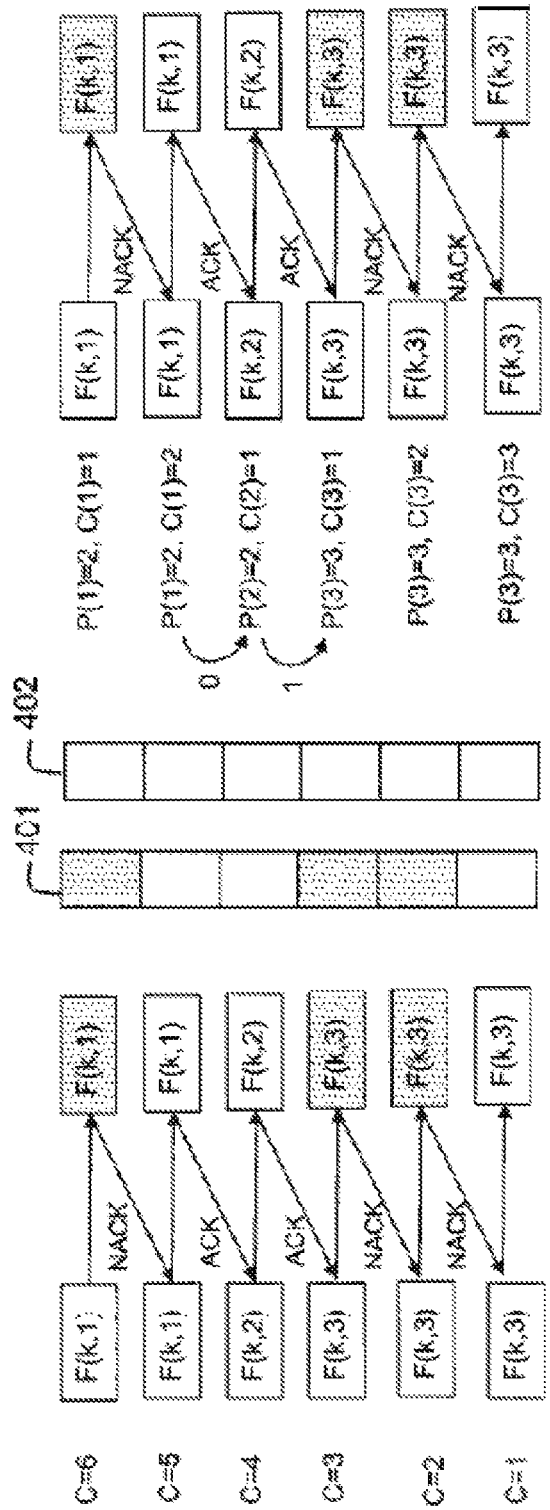

FIGS. 4a and 4b illustrate in one and the same example, the operation of the method according to the invention in comparison to that of the method according to the prior art in the case where the return pathway's transmission channel is assumed perfect.

The direct channel 401 and the return pathway 402 are represented, for each packet transmitted, by a white background if no transmission error impacts the packet and by a dotted background in the converse case.

The example of FIGS. 4a and 4b relate to the transmission of an IP packet IP(k) fragmented into three fragments F(k,1), F(k,2) and F(k,3).

In the case of the solution of the prior art, illustrated in FIG. 4a, the total retransmission credit allocated for all the fragments of the packet IP(k) to be transmitted is taken equal to C_MSDU=6.

The first fragment F(k,1) transmitted is corrupted by the channel 401, a negative acknowledgement NACK is sent by the receiver and received by the emitter which then retransmits the first fragment F(k,1). This second transmission is received correctly by the receiver which sends a positive acknowledgement ACK which is received by the emitter which validates the correct transmission of the first fragment. The second fragment F(k,2) is thereafter transmitted, it is received correctly by the receiver which returns a positive acknowledgement ACK to the emitter. The third fragment F(k,3) is then transmitted and requires two retransmissions for correct forwarding to the receiver. The entire retransmission credit is thus consumed by the process to correctly forward the whole of the packet IP(k).

FIG. 4b illustrates, in the same example, the operation of the method according to the invention. The persistences allocated to each fragment are taken equal to 2, thus entailing an overall retransmission credit at the maximum equal to 6 as in the case of FIG. 4a.

The first fragment F(k,1) requires two transmissions before receipt of a positive acknowledgement therefore the maximum credit allocated to the first fragment is consumed. No transference of credit is carried out to the second fragment.

The second fragment F(k,2) requires only a single transmission before receipt of a positive acknowledgement therefore the credit allocated to this fragment is not fully consumed. The remaining credit, here equal to 1 retransmission, is transferred to the third fragment.

The third fragment therefore benefits from a retransmission credit equal to the initially allocated persistence (equal to 2) to which is added the credit transference (equal to 1) of the previous fragment. Thus, three retransmissions are possible for the third fragment F(k,3) instead of the two initially configured.

Figure 5:
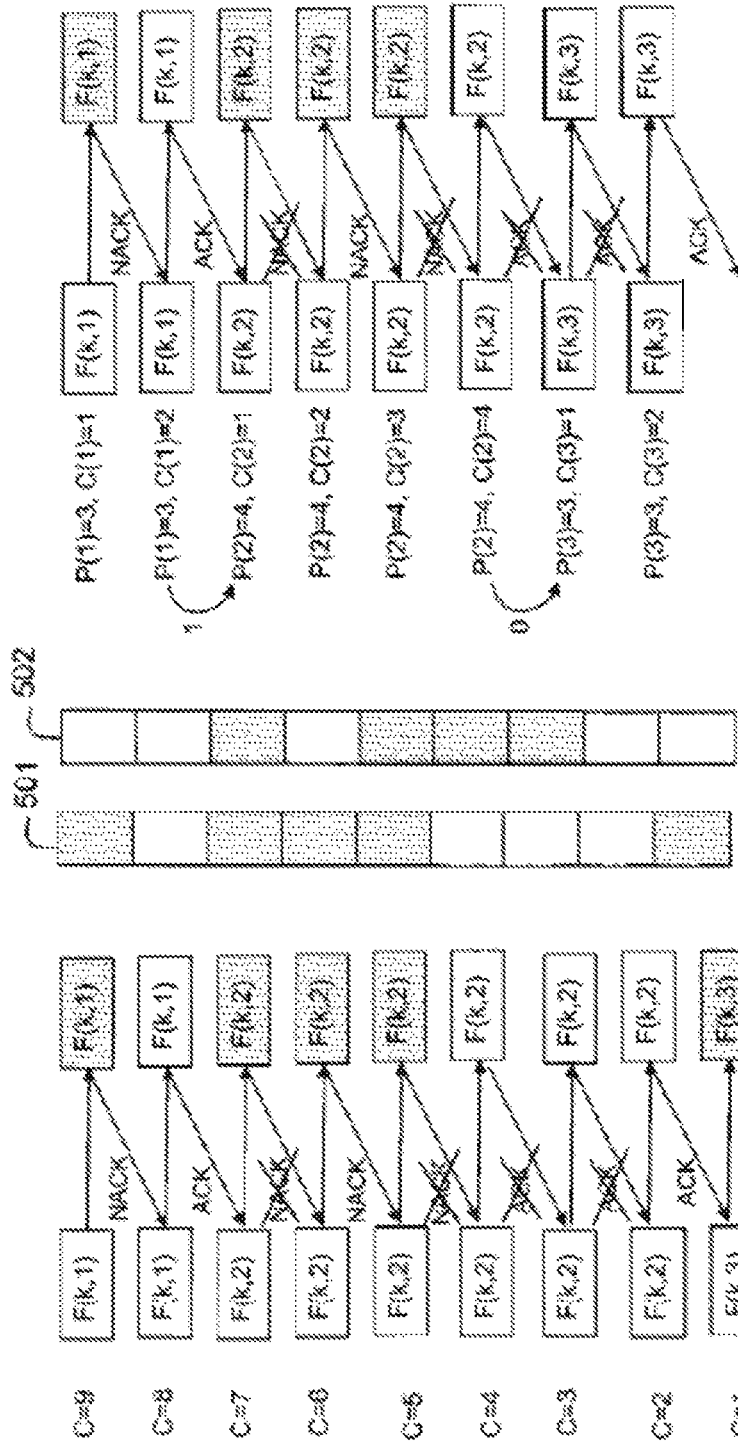

FIGS. 5a and 5b illustrate in another example, the operation of the method according to the invention in comparison to that of the method according to the prior art in the case where the return pathway's transmission channel is assumed imperfect.

The direct channel 501 and the return pathway 502 are represented, for each packet transmitted, by a white background if no transmission error impacts the packet and by a dotted background in the converse case.

The example of FIGS. 5a and 5b corresponds to the transmission of a packet IP(k) fragmented into three fragments F(k,1), F(k,2) and F(k,3).

In the case of the solution of the prior art, illustrated in FIG. 5a, the total retransmission credit allocated for all the fragments of the packet IP(k) to be transmitted is taken equal to C_MSDU=9.

The first fragment F(k,1) requires two transmissions before correct receipt of a positive acknowledgement. The second fragment F(k,2) is corrupted during its first transmission. The negative acknowledgement generated by the receiver is itself corrupted during its transmission on the return pathway 502. The emitter does not therefore receive any valid acknowledgement (positive or negative). In this case, it retransmits the second fragment F(k,2) again. In total, the second fragment F(k,2) requires six successive transmissions for it to be received correctly by the receiver and for the acknowledgement transmitted by the receiver to be received correctly by the emitter. Thus, the last fragment F(k,3) now benefits from only a single transmission credit. As the latter is corrupted during its first dispatch and since the entire allocated credit is exhausted, the method according to the prior art culminates in a failure of the transmission of the last fragment and therefore of the whole of the packet IP(k).

The method according to the invention, illustrated in FIG. 5b in the same example, makes it possible to transmit, for the same channel configuration, the whole of the packet IP(k) in a time span of less than the allocated total time span.

In the example of FIG. 5b, the configuration of the persistences is taken equal to 3 for each fragment. The first fragment F(k,1) requires two transmissions before receipt of a valid positive acknowledgement, therefore a credit transference of one unit is performed to the next fragment. The second fragment therefore benefits from a retransmission credit of 4 instead of the credit of 3 initially allocated. Four retransmissions being required to correctly transmit the second fragment F(k,2) and receive a valid positive acknowledgement, the credit transference is, in this example, indispensable for ensuring correct transmission of the second fragment. The third fragment does not benefit from any credit transference but only two transmissions are required for correct transmission and a validly received positive acknowledgement. Thus, the packet IP(k) is fully transmitted with an overall transmission cost equal to 8 transmitted fragments whereas the solution of the prior art does not make it possible to culminate in correct transmission even with an overall credit equal to 9.

Figure 6:
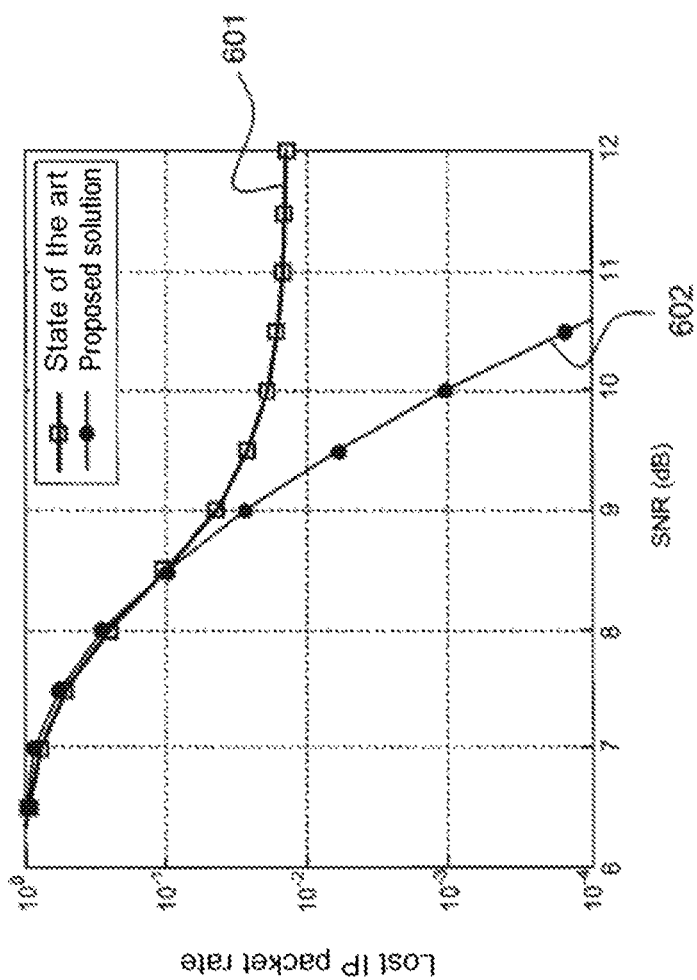

FIG. 6 illustrates, in a chart, the untransmitted IP packet rate as a function of the signal-to-noise ratio, SNR, expressed in decibels for a transmission channel of Gaussian white noise type and an imperfect return channel. Each IP packet is fragmented into three fragments as in the previous examples. Curve 601 relates to the method of the prior art for an overall transmission credit equal to 9. Curve 602 relates to the method according to the invention with an apportionment of the persistences equal to 3 for each of the three fragments of the IP packet to be transmitted. FIG. 6 clearly illustrates the performance gain for signal-to-noise ratios of greater than 8.5 dB.

FIGS. 7a, 7b and 7c represent three charts illustrating the comparative performance of the method according to the prior art and according to the invention, for two different configurations, in terms of distribution of the probabilities of correct transmission of the fragments in an IP packet.

The transmission scenario is the same as for the previous examples, namely that the IP packet is fragmented into 3 successively transmitted fragments.

In each of the charts is represented the probability that a fragment is not correctly transmitted as a function of the packet loss rate engendered by the transmission channel.

FIG. 7a relates to the case of a configuration of the persistences of 9 for the $1^{st}$ fragment, 0 for the $2^{nd}$ fragment and 0 for the 3rd fragment. This case corresponds to the prior art solution for which an overall credit of 9 transmissions is allocated for the IP packet as a whole. Logically, the probability of incorrect transmission of the $1^{st}$ fragment 711 is lower than that of the $2^{nd}$ fragment 712 which is itself lower than that of the $3^{rd}$ fragment 713. The $1^{st}$ fragment is favored in all cases, and the non-transmission rate for the last fragment is high since the retransmission credit allocated to the last fragment is in all cases low.

FIG. 7b relates to the case of the method according to the invention with a configuration of the persistences of 1 for the $1^{st}$ fragment, 2 for the $2^{nd}$ fragment and 6 for the $3^{rd}$ fragment. It is noted in this case that the order of the probability curves is inverted. The probability of non-transmission of the $1^{st}$ fragment 721 is the highest followed by that of the $2^{nd}$ fragment 722. The probability associated with the last fragment 723 is the lowest and is even better than in the case of the prior art solution of FIG. 7a. This configuration [1 2 6] is adapted to the case where the correct transmission of the last fragment is favored with respect to the first two fragments.

FIG. 7c relates to the case of the method according to the invention with a configuration of the persistences of 4 for the $1^{st}$ fragment, 3 for the $2^{nd}$ fragment and 2 for the last fragment. In this case, the three error probability curves relating to the $1^{st}$ fragment 731, to the $2^{nd}$ fragment 732 and to the 3rd fragment 733 are substantially merged thus entailing better uniformity of the probabilities of correct transmission of each fragment.

The method according to the invention is thus configured by the persistence, or initial maximum number of retransmissions, allocated to each fragment. It should be noted that, to stand out from the solution of the prior art consisting in assigning the whole of the retransmission cost to the $1^{st}$ packet, the persistence assigned to the $1^{st}$ packet must be strictly less than said overall retransmission cost.

The configuration of the invention may, for example, be performed in the following manner.

A service quality setting $PER_{IP}$ corresponding to the error rate in the IP packets at the acceptable maximum for the system is predetermined. This probability of error in the IP packets, subjected to the retransmission mechanism according to the invention, may be formulated according to the following relation:

$$PER_{IP} = 1 - \sum_{n=N}^{C} P_N(n)$$

where $P_N(n)$ is the probability of receiving the N fragments of an IP packet in exactly n transmissions and C is the overall transmission cost for the IP packet. C is equal to the sum of the persistences P(i) for each fragment of one and the same IP packet.

$$C = \sum_{i=1}^{N} P(i)$$

The probability $P_N(n)$ may be calculated by enumeration of the events with the aid of the following relation:

$$P_N(n) = f(P_{channel}, \Xi_{N,n})$$

where the set $\Xi_{N,n}((P(i))_{1 \leq i \leq N})$ gives the combinatorics associated with the technique described and depends on the initial distribution of the transmission credits P(i), and $P_{channel}$ is the probability of error of a packet transmitted on the channel.

The probability $P_{channel}$ being assumed known to the emitter, the total credit C to be used being able to be fixed by a maximum time span constraint, it is possible to calculate the probability of error of the IP packet for all the possible combinations of apportionment of persistence values P(i) for each fragment of an IP packet. The possible number of combinations is equal to the number of combinations of N−1 from among C−1 denoted $\binom{C-1}{N-1}$.

The distribution of the persistences P(i) for i varying from 1 to N which is retained is that which gives an error probability $PER_{IP}$ closest to the service quality setting.

By way of examples for a maximum transmission cost equal to C=7 and a number N=3 of fragments for an IP packet, the set $\Xi_{N,n}((P(i))_{1\leq i\leq N})$ associated with the initial distribution [3 2 2] is equal to {{1,1,5},{1,2,4},{1,3,3},{1,4,2},{2,1,4},{2,2,3},{2,3,2},{3,1,3},{3,2,2}}.

The set associated with the initial distribution [2 2 3] is equal to {{1,1,5},{1,2,4},{1,3,3},{2,1,4},{2,2,3}}.

The invention applies advantageously in respect of any communications system implementing a mechanism for fragmenting data packets to be transmitted on an imperfect transmission channel such as a wireless channel. It applies notably in respect of network protocols of ARQ (Automatic Repeat reQuest) or HARQ (Hybrid ARQ) type and in respect of the 3GPP LTE and IEEE 802.16 (WiMAX) standards.

The method according to the invention may be implemented by network software deployed at the level of the MAC layer of a network stack. In such a case, the method according to the invention may be available as a computer program product on a computer readable medium.

The invention claimed is:

1. A method for retransmitting fragmented packets between an emitter and a receiver, said fragmented packets being obtained by a fragmentation of a data packet to be transmitted, wherein for each said fragmented packet said method comprises:
    assigning a persistence P(i) of transmission to each fragmented packet, so that a sum of the persistences assigned to said fragmented packets is equal to a predetermined overall cost C of transmitting said data packet and that the persistence P(1) assigned to a first fragmented packet, among said fragmented packets, is less than said overall cost C;
    adding an error-detecting code CRC to each said fragmented packet;
    incrementing a transmission credit counter c(i), initialized beforehand to 0, and transmitting said fragmented packet to the receiver;
    on receipt of a positive acknowledgement of receipt of said fragmented packet, transferring the transmission credit counter remaining P(i)–c(i) to a next fragmented packet using a relationship:

P(i+1)=P(i+1)+P(i)–c(i);

on receipt of a negative acknowledgement of non-receipt of said fragmented packet or if no acknowledgement is received after a predetermined time span:
    if the transmission credit counter c(i) is less than the persistence P(i), retransmitting said fragmented packet and incrementing said transmission credit counter c(i),
    if the transmission credit counter c(i) is not less than the persistence P(i), inferring a failure of a transmission of said fragmented packet.

2. The method of retransmission as claimed in claim 1, wherein values of the persistences P(i) that are assigned to said fragmented packets is selected, from among a set of possible distributions, to obtain a probability of error of transmission of the data packet that is closest to a given probability of error.

3. An emitter of data packets comprising means suitable for implementing the retransmission method as claimed claim 2.

4. A non-transitory computer readable medium including a computer program comprising instructions for the execution of the retransmission method as claimed in claim 2, when the program is executed by a processor.

5. The method of retransmission as claimed in claim 1, wherein the values of persistences P(i) assigned to each said fragmented packet are configured so as to favor a correct transmission of a particular fragmented packet.

6. An emitter of data packets comprising means suitable for implementing the retransmission method as claimed claim 5.

7. A non-transitory computer readable medium including a computer program comprising instructions for the execution of the retransmission method as claimed in claim 5, when the program is executed by a processor.

8. The method of retransmission as claimed in claim 1, wherein the persistence P(i) is identical for each said fragmented packet.

9. An emitter of data packets comprising means suitable for implementing the retransmission method as claimed claim 8.

10. A non-transitory computer readable medium including a computer program comprising instructions for the execution of the retransmission method as claimed in claim 8, when the program is executed by a processor.

11. The method of retransmission as claimed in claim 1, wherein an error-correcting code is added to each said fragmented packet.

12. An emitter of data packets comprising means suitable for implementing the retransmission method as claimed claim 11.

13. A non-transitory computer readable medium including a program comprising instructions for the execution of the retransmission method as claimed in claim 11, when the program is executed by a processor.

14. The method of retransmission as claimed in claim 1, wherein the data packet is an IP packet and the transmitted fragmented packets are MAC packets.

15. An emitter of data packets comprising means suitable for implementing the retransmission method as claimed claim 14.

16. A non-transitory computer readable medium including a computer program comprising instructions for the execution of the retransmission method as claimed in claim 14, when the program is executed by a processor.

17. An emitter of data packets comprising means suitable for implementing the retransmission method as claimed claim 1.

18. A system for transmitting data comprising an emitter as claimed in claim 17 and a receiver configured to receive a fragmented packet, checking integrity of the fragmented packet and transmitting to the emitter a positive acknowledgement if said fragmented packet is correct and a negative acknowledgement if said fragmented packet is corrupted.

19. A non-transitory computer readable medium including a computer program comprising instructions for the execution of the retransmission method as claimed in claim 1, when the program is executed by a processor.

20. A non-transitory recording medium readable by a processor on which is recorded a program comprising instructions for the execution of the retransmission method as claimed in claim 1, when the program is executed by a processor.

* * * * *